UNITED STATES PATENT OFFICE.

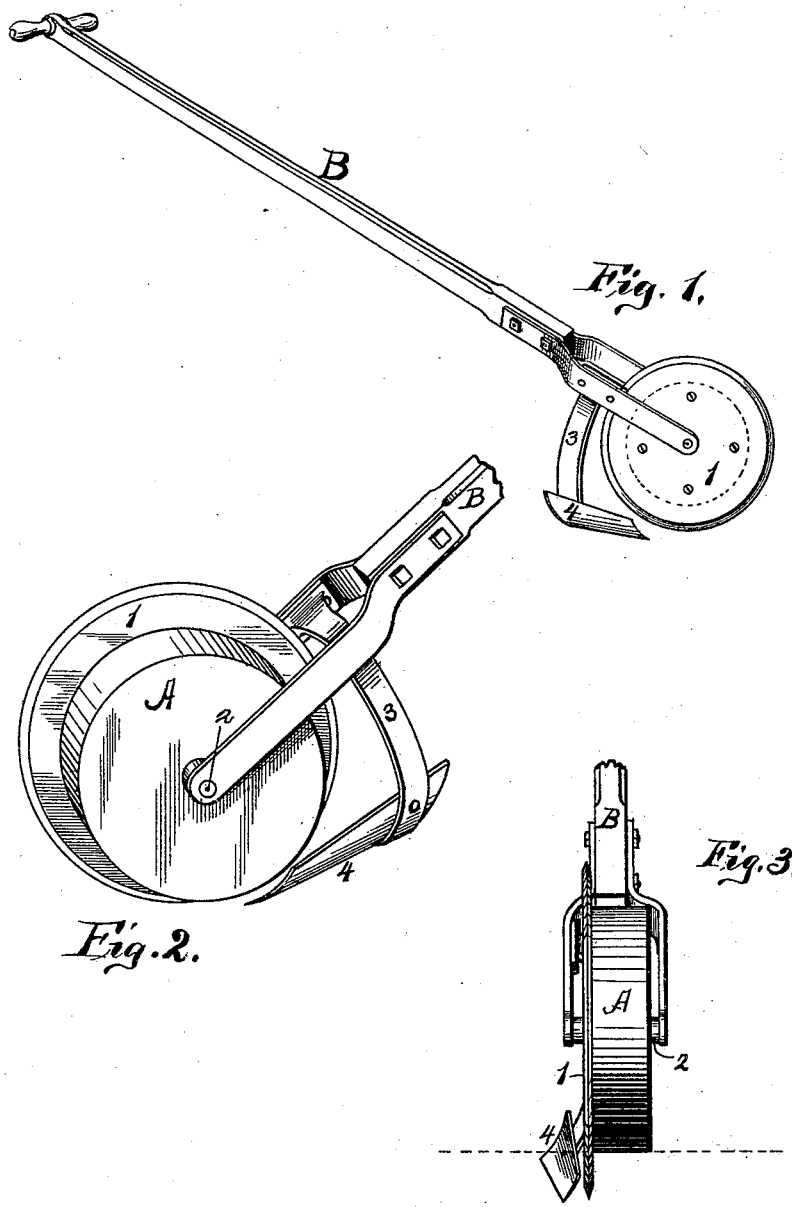

WILLIAM PULLAR, OF ITHACA, NEW YORK.

SOD-TRIMMING MACHINE.

SPECIFICATION forming part of Letters Patent No. 487,058, dated November 29, 1892.

Application filed May 7, 1892. Serial No. 432,122. (No model.)

*To all whom it may concern:*

Be it known that I, WILLIAM PULLAR, of Ithaca, in the county of Tompkins, in the State of New York, have invented new and useful Improvements in Sod-Trimming Machines, of which the following, taken in connection with the accompanying drawings, is a full, clear, and exact description.

My invention relates to the construction of sod cutters and trimmers.

My object is to produce a device for trimming the edges of the sod along the walks or driveways, thus enabling me to do the work uniformly and rapidly, cheap, durable in construction, and of great utility.

My invention consists, first, in providing the sod-wheel with a cutting-disk; second, in providing means for removing the edges of the sod so cut where it can be readily gathered and taken away, and in the several other novel features of construction and operation hereinafter described, and which are specifically set forth in the claim hereto annexed. It is constructed as follows, reference being had to the accompanying drawings, in which—

Figure 1 is a view of the cutter complete, showing the side upon which the cutting-disk is located. Fig. 2 is an enlarged view of the opposite side, with the handle broken away. Fig. 3 is a front end view thereof.

A is a sod-wheel constructed substantially as shown in the drawings, having the cutting-disk 1, secured upon one end thereof, the periphery of said disk being beveled or otherwise sharpened, so as to readily cut the sod when the machine is pushed along by means of the handle B, secured to the axis 2 in the ordinary way.

3 is a downwardly-extending arm secured to the side of the handle adjacent to the disk 1 and is provided upon its lower end with a preferably-concaved mold-board 4, traveling just outside of the rear end of the disk 1, for the purpose of throwing the sod, dirt, and other material away from the edge of the lawn or sod as fast as it has been cut by the rotating disk.

My invention is operated as follows: I first preferably mark the edges desired to be cut and then push or shove the machine over the sod, allowing the disk 1 to travel upon the mark, and the weight of the machine, being sufficient, will force it through the sod and when the mold-board comes along it is loosened and thrown out of the way.

Having described my invention, what I claim is—

In a sod-cutting machine, the sod-wheel having a cutting-disk secured thereto, the handle B, and the arm 3, having a mold-board secured thereto, as set forth.

In witness whereof I have hereunto set my hand this 2d day of May, 1892.

WM. PULLAR.

In presence of—
SIMEON SMITH,
GEO. L. PRICE.